US012591439B2

(12) United States Patent
Rothberg et al.

(10) Patent No.: US 12,591,439 B2
(45) Date of Patent: Mar. 31, 2026

(54) MANAGING A CONTAINERIZED SERVICE USING A SYSTEM MANAGER AND A DEPLOYMENT ENGINE INDICATING AN OPERATIONAL STATUS OF THE ONE OR MORE CONTAINERS

(71) Applicant: RED HAT, INC., Raleigh, NC (US)

(72) Inventors: Valentin Rothberg, Nieul-sur-Mer (FR); Daniel Walsh, Wells, ME (US)

(73) Assignee: Red Hat, Inc., Raleigh, NC (US)

( * ) Notice: Subject to any disclaimer, the term of this patent is extended or adjusted under 35 U.S.C. 154(b) by 172 days.

(21) Appl. No.: 18/197,248

(22) Filed: May 15, 2023

(65) Prior Publication Data

US 2024/0385853 A1     Nov. 21, 2024

(51) Int. Cl.
*G06F 9/445*     (2018.01)

(52) U.S. Cl.
CPC ................................ *G06F 9/44505* (2013.01)

(58) Field of Classification Search
CPC .................................................. G06F 9/44505
See application file for complete search history.

(56) References Cited

U.S. PATENT DOCUMENTS

| | | | |
|---|---|---|---|
| 10,873,592 B1 | 12/2020 | Singh et al. | |
| 11,449,354 B2 | 9/2022 | Fu et al. | |
| 11,855,857 B2* | 12/2023 | Kuriu | G06F 9/45558 |
| 2018/0285165 A1* | 10/2018 | Helsley | G06F 9/5077 |
| 2019/0004779 A1* | 1/2019 | Schmidt | G06F 9/46 |

| | | | |
|---|---|---|---|
| 2021/0067408 A1* | 3/2021 | Vaidya | G06F 9/45558 |
| 2022/0171648 A1 | 6/2022 | Rodriguez et al. | |
| 2023/0261950 A1* | 8/2023 | Xie | H04L 41/0843 |
| | | | 709/222 |

FOREIGN PATENT DOCUMENTS

CN          112532722 A        3/2021

OTHER PUBLICATIONS

"Red Hat Enterprise Linux CoreOS (RHCOS)", https://docs.openshift.com/container-platform/4.8/architecture/architecture-rhcos.html, 2023; pp. 1-15.

(Continued)

*Primary Examiner* — Tammara R Peyton
(74) *Attorney, Agent, or Firm* — Kilpatrick Townsend & Stockton LLP

(57) ABSTRACT

A containerized service can be managed using a system manager and a deployment engine. The system manager can receive a service identifier that can identify a configuration file of the containerized service. The configuration file can be used to initiate one or more containers to run the containerized service. The system manager can transmit the configuration file to the deployment engine integrated with the system manager. The deployment engine can create a service container prior to initiating the one or more containers that can run the containerized service based on a container status of the service container. The service container can be used to manage the one or more containers. The system manager can initiate the containerized service in response to receiving a ready notification from the deployment engine indicating an operational status of the one or more containers.

14 Claims, 3 Drawing Sheets

(56)         References Cited

OTHER PUBLICATIONS

Grunert, Sascha, "Under the hood of CRI-O, Kubernetes Container Runtime", https://vmblog.com/archive/2019/10/30/under-the-hood-of-cri-o-kubernetes-container-runtime.aspx#.ZCul2XZBw2w; pp. 1-8.
Kumar, Madhura, "Mastering Kubernetes Jobs and Kubernetes CronJobs: a developer guide", https://www.airplane.dev/blog/mastering-kubernetes-jobs-and-kubernetes-cronjobs-a-developer-guide, Feb. 11, 2023; pp. 1-13.
"Kubernetes 1.12: Kubelet TLS Bootstrap and Azure Virtual Machine Scale Sets (VMSS) Move to General Availability", https://people.wikimedia.org/~jayme/k8s-docs/v1.16/blog/2018/09/27/kubernetes-1.12-kubelet-tis-bootstrap-and-azure-virtual-machine-scale-sets-vmss-move-to-general-availability/, Sep. 27, 2018; pp. 1-7.

* cited by examiner

200

Processing Device 202

Memory Device 204

Instructions 206

System Manager 104

Deployment Engine 106

Ready Notification 118

Containerized Service 102

Configuration File 112

Service Container 116

Operational Status 128

One or More Containers 114

300

302
Receive, by a system manager, a service identifier configured to identify a configuration file of a containerized service, the configuration file usable to initiate one or more containers to run the containerized service

304
Transmit, by the system manager, the configuration file to a deployment engine integrated with the system manager, the deployment engine being configured to create a service container prior to initiating the one or more containers

306
Initiate, by the system manager, the containerized service in response to receiving a ready notification from the deployment engine indicating an operational status of the one or more containers

*FIG. 3*

MANAGING A CONTAINERIZED SERVICE USING A SYSTEM MANAGER AND A DEPLOYMENT ENGINE INDICATING AN OPERATIONAL STATUS OF THE ONE OR MORE CONTAINERS

TECHNICAL FIELD

The present disclosure relates generally to deploying software in a computing environment. More specifically, but not by way of limitation, this disclosure relates to managing a containerized service using a system manager and a deployment engine.

BACKGROUND

Software can be deployed in computing environments using image files. An image file is generally a static file that includes executable code usable to deploy the software in a computing environment. An image file may also include the software's dependencies. Examples of such dependences can include the operating system, configuration files, packages, and libraries used to run the software. Incorporating the software's dependencies into the image files may allow the software to be quickly and easily deployed.

Image files are often configured for deploying their corresponding software inside isolated virtual environments that exist within a larger computing environment. For example, an image file may be configured to deploy software inside a container of a computing environment. A container is a relatively isolated virtual environment that can be generated by leveraging resource isolation features (e.g., cgroups and namespaces) of the Linux kernel. A deployment tool such as Docker® can be used to deploy the software inside the container from the image file. Deployment of software inside of such containers can be referred to as containerization.

BRIEF DESCRIPTION OF THE DRAWINGS

FIG. 3 is a flowchart of a process for managing a containerized service using a system manager and a deployment engine according to one example of the present disclosure.

DETAILED DESCRIPTION

Figure 1:
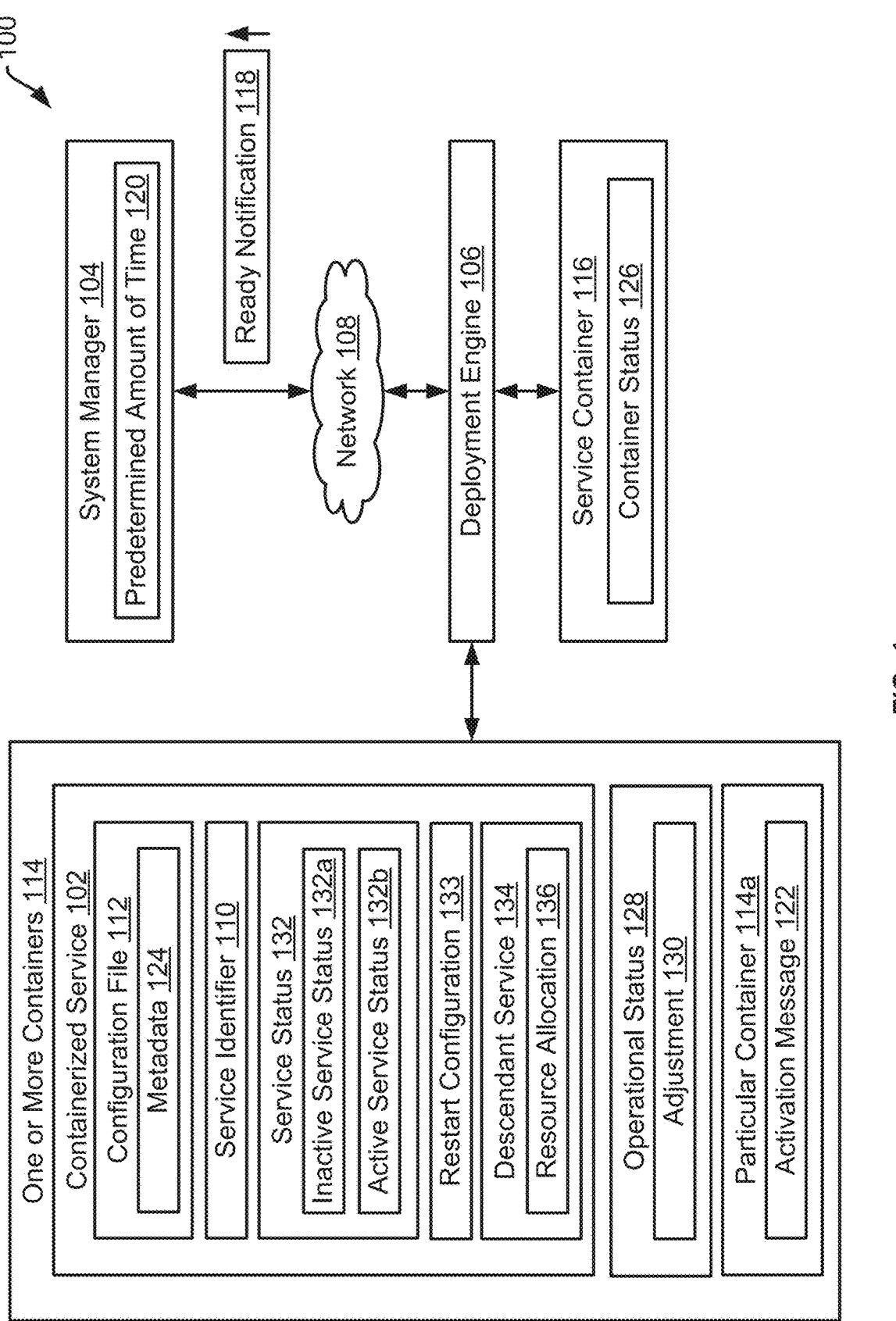
FIG. 1 is a block diagram of an example of a computing environment for managing a containerized service using a system manager and a deployment engine according to one example of the present disclosure.

A distributed computing environment can include a cluster of computing nodes to run containerized applications. Some container orchestration platforms, such as Kubernetes, can be deployed in the distributed computing environment to enable the containerized applications to be executed using the cluster of computing nodes. But, these container orchestration platforms may be resource-intensive, such as exceeding computing resources available on a resource-constrained computing device. Accordingly, the resource consumption of the container orchestration platforms used to run these containerized applications may prevent running the containerized applications outside of the distributed computing environment. For instance, cloud-based environments or edge computing environments may be unable to run the containerized applications using the container orchestration platforms.

Some examples of the present disclosure can overcome one or more of the issues mentioned above by using a system manager and a deployment engine integrated with the system manager to manage a containerized service running using one or more containers. The system manager and the deployment engine can have a smaller resource footprint (e.g., with respect to RAM, storage, etc.) compared to container orchestration platforms. Thus, using the system manager and the deployment engine can enable running the service on resource-constrained devices, such as field-deployed devices that may be positioned in remote or uncontrolled locations with limited network connectivity. The system manager can identify a configuration file of the containerized service using a service identifier corresponding to the containerized service. The system manager then may transmit the configuration file to the deployment engine such that the deployment engine can initiate the containers used to run the containerized service. The deployment engine can create a service container to manage the containers prior to initiating the containers used to run the containerized service.

In some instances, the deployment engine may determine that at least one container of the containers is operational before transmitting a ready notification to the service manager. Once the service manager receives the ready notification from the deployment engine, the system manager can initiate the containerized service. Additionally, the system manager can monitor the service container to facilitate lifecycle management of the containers. If the system manager detects that the service container is inactive (e.g., killed or stopped), the system manager can mark the containerized service as inactive. The service container may become inactive due to the containers associated with the service container being inoperative, such as having exited or been killed. In some instances, the system manager then may restart the containers or the service container to re-activate the containerized service.

In one particular example, a system manager can receive a main process identification (PID) as a service identifier that the system manager may use to manage a containerized service. The system manager can use the main PID to identify a configuration file that may be created using a human-readable data-serialization language, such as Yet Another Markup Language (YAML). The system manager then may transmit this configuration file to a deployment engine integrated with the system manager to use the configuration file to initiate one or more containers to run the containerized service. Before initiating the containers, the deployment engine can create a service container associated with the containers to manage a lifecycle of the containers. Additionally, the deployment engine may identify an extension of the configuration file that includes metadata interpretable by the deployment engine. Based on the extension of the configuration file, the deployment engine may avoid sending a ready notification to the system manager until one or more status notifications associated with the containers are received. Once the deployment engine receives the status notifications and determines that the containers are operational, the deployment engine can transmit the ready notification to the system manager to initiate the containerized service using the containers.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 for managing a containerized service 102 using a system manager 104 and a deployment engine 106 according to one example of the present disclosure. In some examples, the system manager 104 can be associated with a computer program (e.g., a daemon) that runs as a background process. Examples of the system manager 104 can include systemd, launchd, Service Management Facility, Runit, OpenRC, or other suitable software. Examples of the deployment engine 106 can include Podman, Docker, or other suitable containerization tools.

The computing environment 100 can include a desktop computer, laptop computer, server, mobile phone, or tablet. Components within the computing environment 100 may be communicatively coupled via a network 108, such as a local area network (LAN), wide area network (WAN), the Internet, or any combination thereof. For example, the computing environment 100 can include the system manager 104 and the deployment engine 106 that can be communicatively coupled through the network 108. In some examples, the deployment engine 106 can be integrated with the system manager 104, for example through an application programming interface (API).

The system manager 104 can manage the containerized service 102 using a service identifier 110 that is usable to identify a configuration file 112 of the containerized service 102. For example, the service identifier 110 can be a main process identification (PID) associated with the containerized service 102. In some examples, the system manager 104 can determine a control group that the containerized service 102 may be associated with using the service identifier 110. The control group can define a set of services that are restricted using similar criteria, such as a set of parameters or limits. The computing environment 100 can allocate computing resources (e.g., system memory, network bandwidth, etc.) to the containerized service 102 based on the control group of the containerized service 102.

To identify the configuration file 112, the system manager 104 may use the service identifier 110 to search a database storing one or more configuration files. In some examples, the configuration file 112 may be a specification file, for example created using a human-readable data-serialization language, such as Yet Another Markup Language (YAML). The configuration file 112 can be used to initiate one or more containers 114 to run the containerized service 102. For example, the configuration file 112 may specify a certain number of the containers 114 to initiate and run the containerized service 102. Additionally or alternatively, the configuration file 112 can specify a deployment strategy of the containerized service 102 or which container image file to use for each container of the containers 114.

Once the system manager 104 identifies the configuration file, the system manager can transmit the configuration file 112 to the deployment engine 106 such that the deployment engine 106 can initiate the containers 114. In some examples, the deployment engine 106 additionally may initiate subprocesses associated with the containerized service 102. Prior to initiating the containers 114, the deployment engine 106 may create a service container 116 that can be used to manage a lifecycle of the containers 114, for example based on a container status 126 of the service container 116. The service container 116 can exist longer than the containers 114, enabling the service container 116 to span the lifecycle of the containers 114.

Once the deployment engine 106 initiates the containers 114, the deployment engine 106 can transmit a ready notification 118 to the system manager 104 such that the system manager 104 then can initiate the containerized service 102. The ready notification 118 can indicate that all of the containers 114 or a subset of the containers 114 are running and able to run the containerized service 102. Additionally or alternatively, the system manager 104 may use a message-oriented middleware mechanism (e.g., Desktop Bus (D-Bus)) to receive the ready notification 118 from the containers 114. The message-oriented middleware mechanism can enable communication between multiple processes running concurrently in the computing environment 100. For example, the message-oriented middleware mechanism can provide a communication channel to communicatively couple the system manager 104 with the containerized service 102.

In some examples, if the system manager 104 does not receive the ready notification 118 within a predetermined amount of time 120, the system manager 104 may prevent the containerized service 102 from being initiated. For example, exceeding the predetermined amount of time 120 can cause a connection between the system manager 104 and the deployment engine 106 used to transmit the ready notification 118 to time out. The predetermined amount of time 120 may be a certain number of seconds, minutes, hours, days, or another suitable measure of time passed.

In some examples, the deployment engine 106 may delay transmitting the ready notification 118 until the deployment engine 106 receives an activation message 122 from a particular container 114a of the containers 114. The activation message 122 can indicate that the particular container 114a is active. In some examples, the deployment engine 106 may wait for an activation message 122 from more than one container of the containers 114. The deployment engine 106 may delay transmitting the ready notification 118 due to each container of the containers 114 being ready at different times. For example, if the particular container 114a is associated with a database, the particular container 114a may have a longer startup time compared to other containers of the containers 114. In such examples, the database associated with the particular container 114a may need time to set up tables of the database before being able to process requests. Accordingly, the deployment engine 106 may avoid transmitting the ready notification 118 until the activation message 122 is received from the particular container 114a.

The deployment engine 106 may identify the particular container 114a by parsing metadata 124 of the configuration file 112. For example, the configuration file 112 may include an extension created using annotations or metadata 124. The deployment engine 106 can read and parse the metadata 124 to interpret the extension to identify the particular container 114a. Once the deployment engine 106 identifies the particular container 114a, the deployment engine 106 can delay transmitting the ready notification 118 until an activation message 122 from the particular container 114a is received. Additionally or alternatively, the system manager 104 may include one or more settings that indicate the particular container 114a to the deployment engine 106. For example, the settings can be at least in part created by a developer associated with the containerized service 102.

Once the system manager 104 initiates the containerized service 102, the system manager 104 can use the service container 116 to monitor the containers 114 running the containerized service 102. The service container 116 can be created before the containers 114 are initiated and can be stopped after the containers 114 become inactive, for example after being killed. While the containers 114 are initiated and operational, a container status 126 of the service container 116 may be active. The container status 126 of the service container 116 may become inactive once the containers 114 are inactive. Thus, the system manager 104 can monitor the container status 126 of the service container 116 to determine an operational status 128 of the containers 114. In other words, the container status 126 can reflect or indicate the operational status 128 of the containers.

The operational status 128 of the containers 114 may be active to indicate that the containers 114 are active and running the containerized service. In some examples, the operational status 128 may be inactive to indicate that the containers 114 are inactive (e.g., due to being killed, exited, stopped, etc.). The system manager 104 can detect an adjustment 130 to the operational status 128 of the containers 114, for example based on the container status 126 of the service container 116. For example, if the system manager 104 detects that the container status 126 of the service container 116 is inactive, the system manager 104 can adjust a service status 132 of the containerized service 102 to be inactive.

The inactive service status 132a of the containerized service 102 can indicate that the container status 126 is inactive and that the operational status 128 of the containers 114 is inactive. Conversely, an active service status 132b may indicate that the container status 126 is active and that the operational status 128 is active. In some examples, the adjustment 130 to the operational status 128 of the containers to be inactive may occur after a predetermined number of the containers 114 become inactive. For example, the operational status 128 can be adjusted after 70% of the containers 114 become inactive, for instance having exited or been stopped. In some examples, after adjusting the service status 132 to be inactive, the system manager 104 may identify a restart configuration 133 of the containerized service 102. Based on the restart configuration 133, the system manager 104 can adjust the service status 132 to be active such that the containerized service 102 is restarted or resumed.

In some examples, a descendant service 134 may be created based on the containerized service 102, for example by forking off of the containerized service 102. The system manager 104 can identify the descendant service 134 using the service identifier 110. In some examples, the containerized service 102 may be associated with more than one descendant service 134 that can each be monitored by the system manager 104 using the service identifier 110. Once the system manager 104 identifies the descendant service 134, the system manager 104 can monitor or implement adjustments to the descendant service 134. For example, the system manager 104 may stop both the containerized service 102 and the descendant service 134 to completely end an application or a process. Additionally or alternatively, the system manager 104 can use the service identifier 110 to adjust a resource allocation 136 (e.g., CPU time, RAM, storage, etc.) associated with the containerized service 102 or the descendant service 134.

While FIG. 1 depicts a specific arrangement of components, other examples can include more components, fewer components, different components, or a different arrangement of the components shown in FIG. 1. For instance, in other examples, the containers 114 may include more than one particular container 114a. Accordingly, the deployment engine 106 may delay transmitting the ready notification 118 until the activation message 122 from each particular container 114a is received. Additionally, any component or combination of components depicted in FIG. 1 can be used to implement the process(es) described herein.

Figure 2:
FIG. 2 is a block diagram of another example of a computing environment for managing a containerized service using a system manager and a deployment engine according to one example of the present disclosure.
Figure 2:
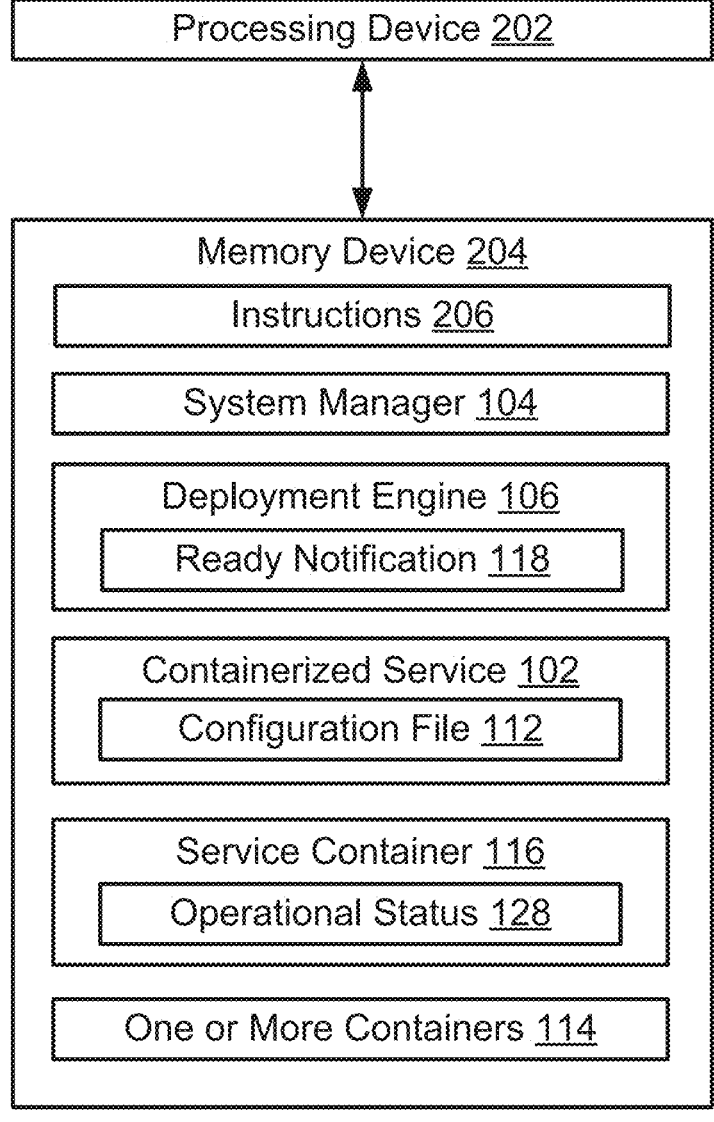

FIG. 2 is a block diagram of another example of a computing environment 200 for managing a containerized service using a system manager and a deployment engine according to one example of the present disclosure. The computing environment 200 can include a processing device 202 communicatively coupled to a memory device 204.

The processing device 202 can include one processing device or multiple processing devices. The processing device 202 can be referred to as a processor. Non-limiting examples of the processing device 202 include a Field-Programmable Gate Array (FPGA), an application-specific integrated circuit (ASIC), and a microprocessor. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C#, Java, Python, or any combination of these.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. At least some of the memory device 204 includes a non-transitory computer-readable medium from which the processing device 202 can read instructions 206. A computer-readable medium can include electronic, optical, magnetic, or other storage devices capable of providing the processing device 202 with the instructions 206 or other program code. Non-limiting examples of a computer-readable medium include magnetic disk(s), memory chip(s), ROM, random-access memory (RAM), an ASIC, a configured processor, and optical storage.

In some examples, the processing device 202 can execute the instructions 206 to perform operations. For example, the processing device 202 can receive, using a system manager 104, a service identifier 110 that can identify a configuration file 112 of the containerized service 102. The processing device 202 then can use the configuration file 112 to initiate one or more containers 114 to run the containerized service 102. For example, the processing device 202 can use the deployment engine 106 integrated with the system manager 104 to initiate the containers 114 based on the configuration file 112.

Additionally, prior to initiating the containers 114, the processing device 202 may create a service container 116 that can be used to manage the containers 114 based on a container status 126 of the service container 116. Specifically, the container status 126 being inactive can indicate that an operational status 128 of the containers 114 is inactive or stopped. Similarly, the container status 126 being active can indicate that the containers 114 are active and successfully running the containerized service 102. Once the processing device 202 determines that the containers 114 are successfully initiated, the processing device 202 then can initiate the containerized service 102. For example, the processing device 202 can use the deployment engine 106 to transmit a ready notification 118 to the system manager 104 to indicate that the containers 114 are operational. Based on the ready notification 118, the processing device 202 can use the system manager 104 to initiate the containerized service 102.

FIG. 3 is a flowchart of a process 300 for managing a containerized service using a system manager and a deployment engine according to one example of the present disclosure. In some examples, the processing device 202 can perform one or more of the steps shown in FIG. 3. In other examples, the processing device 202 can implement more steps, fewer steps, different steps, or a different order of the steps depicted in FIG. 3. The steps of FIG. 3 are described below with reference to components discussed above in FIGS. 1-2.

In block 302, the processing device 202 receives, by the system manager 104, a service identifier 110 configured to identify a configuration file 112 of the containerized service 102. The configuration file 112 can be used to initiate one or more containers 114 to run the containerized service 102. As an illustrative example, the processing device 202 may receive a main process identifier (PID) that can be used to identify a Yet Another Markup Language (YAML) file as the configuration file 112. Using the YAML file, the processing device 202 can initiate the one or more containers 114 to run a software application.

In block 304, the processing device 202 transmits, by the system manager 104, the configuration file 112 to the deployment engine 106 integrated with the system manager 104. The processing device 202 can use the deployment engine 106 to initiate the one or more containers 114 using the configuration file 112. Additionally, the deployment engine 106 can be configured to create a service container 116 prior to initiating the one or more containers 114. Once the processing device 202 initiates the one or more containers 114 and creates the service container 116, the service container 116 can be used to manage the one or more containers 114. For example, a container status 126 of the service container 116 can be associated with an operational status 128 of the one or more containers 114 that can indicate whether the containers 114 are functional or capable of running the containerized service 102. The processing device 202 can use the container status 126 to determine whether the one or more containers 114 are operational based on the operational status 128. Thus, the processing device 202 can monitor a lifecycle of the one or more containers 114 based on the container status 126 of the service container 116.

In block 306, the processing device 202 initiates, by the system manager 104, the containerized service 102 in response to receiving a ready notification 118 from the deployment engine 106 indicating the operational status 128 of the one or more containers 114. In some examples, the container status 126 of the service container 116 may be associated with a service status 132 of the containerized service 102 that can indicate whether the containerized service 102 is active or inactive. For example, once the processing device 202 initiates the containerized service 102, the containerized service 102 may have an active service status 132*b*.

Once the container status 126 of the service container 116 is inactive, the processing device 202 can adjust the service status 132 of the containerized service 102 to be inactive, indicating that the containerized service 102 has been stopped or failed. In some examples, in response to adjusting the service status 132 to be inactive, the processing device 202 can identify a restart configuration 133 of the containerized service 102 to resume or restart the containerized service 102. For example, the processing device 202 can adjust the service status 132 to be active based on the restart configuration 133.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a memory device including instructions that are executable by the processing device for causing the processing device to perform operations comprising:
  receiving, by a system manager, a service identifier configured to identify a configuration file of a containerized service, the configuration file usable to initiate one or more containers to run the containerized service;
  transmitting, by the system manager, the configuration file to a deployment engine integrated with the system manager, the deployment engine being configured to create a service container prior to initiating the one or more containers, the service container usable to manage the one or more containers configured to run the containerized service based on a container status of the service container;
  initiating, by the system manager, the containerized service in response to receiving a ready notification from the deployment engine indicating an operational status of the one or more containers;
  determining, by the system manager, the operational status for a lifecycle of the one or more containers based on the container status of the service container;
  detecting, by the system manager, an adjustment to the operational status of the one or more containers to be inactive;
  in response to detecting the adjustment to the operational status of the one or more containers to be inactive, adjusting, by the system manager, a service status of the containerized service to be inactive;
  in response to adjusting the service status of the containerized service to be inactive, identifying, by the system manager, a restart configuration of the containerized service; and
  adjusting, by the system manager, the service status of the containerized service to be active based on the restart configuration, the service status of the containerized service being active indicating that the containerized service is restarted and that the container status of the service container is active.

2. The system of claim 1, wherein the deployment engine is configured to transmit the ready notification to the system manager in response to receiving an activation message from a particular container of the one or more containers, and wherein the activation message is configured to indicate that the particular container is active.

3. The system of claim 2, wherein the deployment engine is further configured to identify the particular container of the one or more containers by parsing metadata of the configuration file.

4. The system of claim 1, wherein the operations further comprise, subsequent to initiating the containerized service:

identifying a descendant service associated with the containerized service using the service identifier, wherein the descendant service is created based on the containerized service; and in response to identifying the descendant service, adjusting a resource allocation of the containerized service or the descendant service.

5. The system of claim 1, wherein the operations further comprise, prior to receiving the ready notification from the deployment engine:

determining that a predetermined amount of time has been exceeded with respect to waiting to receive the ready notification from the deployment engine; and in response to determining that the predetermined amount of time has been exceeded, preventing the containerized service from being initiated.

6. A method comprising:

receiving, by a system manager, a service identifier configured to identify a configuration file of a containerized service, the configuration file usable to initiate one or more containers to run the containerized service;

transmitting, by the system manager, the configuration file to a deployment engine integrated with the system manager, the deployment engine being configured to create a service container prior to initiating the one or more containers, the service container usable to manage the one or more containers configured to run the containerized service based on a container status of the service container;

initiating, by the system manager, the containerized service in response to receiving a ready notification from the deployment engine indicating an operational status of the one or more containers;

determining, by the system manager, the operational status for a lifecycle of the one or more containers based on the container status of the service container;

detecting, by the system manager, an adjustment to the operational status of the one or more containers to be inactive;

in response to detecting the adjustment to the operational status of the one or more containers to be inactive, adjusting, by the system manager, a service status of the containerized service to be inactive;

in response to adjusting the service status of the containerized service to be inactive, identifying, by the system manager, a restart configuration of the containerized service; and adjusting, by the system manager, the service status of the containerized service to be active based on the restart configuration, the service status of the containerized service being active indicating that the containerized service is restarted and that the container status of the service container is active.

7. The method of claim 6, wherein the deployment engine is configured to transmit the ready notification to the system manager in response to receiving an activation message from a particular container of the one or more containers, and wherein the activation message is configured to indicate that the particular container is active.

8. The method of claim 7, wherein the deployment engine is further configured to identify the particular container of the one or more containers by parsing metadata of the configuration file.

9. The method of claim 6, further comprising, subsequent to initiating the containerized service:

identifying a descendant service associated with the containerized service using the service identifier, wherein the descendant service is created based on the containerized service; and in response to identifying the descendant service, adjusting a resource allocation of the containerized service or the descendant service.

10. The method of claim 6, further comprising, prior to receiving the ready notification from the deployment engine:

determining that a predetermined amount of time has been exceeded with respect to waiting to receive the ready notification from the deployment engine; and in response to determining that the predetermined amount of time has been exceeded, preventing the containerized service from being initiated.

11. A non-transitory computer-readable medium comprising program code executable by a processing device for causing the processing device to perform operations comprising:

receiving, by a system manager, a service identifier configured to identify a configuration file of a containerized service, the configuration file usable to initiate one or more containers to run the containerized service;

transmitting, by the system manager, the configuration file to a deployment engine integrated with the system manager, the deployment engine being configured to create a service container prior to initiating the one or more containers, the service container usable to manage the one or more containers configured to run the containerized service based on a container status of the service container;

initiating, by the system manager, the containerized service in response to receiving a ready notification from the deployment engine indicating an operational status of the one or more containers;

determining, by the system manager, the operational status for a lifecycle of the one or more containers based on the container status of the service container;

detecting, by the system manager, an adjustment to the operational status of the one or more containers to be inactive;

in response to detecting the adjustment to the operational status of the one or more containers to be inactive, adjusting, by the system manager, a service status of the containerized service to be inactive;

in response to adjusting the service status of the containerized service to be inactive, identifying, by the system manager, a restart configuration of the containerized service; and adjusting, by the system manager, the service status of the containerized service to be active based on the restart configuration, the service status of the containerized service being active indicating that the containerized service is restarted and that the container status of the service container is active.

12. The non-transitory computer-readable medium of claim 11, wherein the deployment engine is configured to transmit the ready notification to the system manager in response to receiving an activation message from a particular container of the one or more containers, and wherein the activation message is configured to indicate that the particular container is active.

13. The non-transitory computer-readable medium of claim 12, wherein the deployment engine is further configured to identify the particular container of the one or more containers by parsing metadata of the configuration file.

14. The non-transitory computer-readable medium of claim 11, wherein the operations further comprise, subsequent to initiating the containerized service:

identifying a descendant service associated with the containerized service using the service identifier, wherein the descendant service is created based on the containerized service; and in response to identifying the descendant service, adjusting a resource allocation of the containerized service or the descendant service.

\* \* \* \* \*